US010887877B2

(12) United States Patent
Zhang et al.

(10) Patent No.: US 10,887,877 B2
(45) Date of Patent: Jan. 5, 2021

(54) METHOD AND APPARATUS FOR TRANSMITTING CONTROL CHANNEL

(71) Applicant: HUAWEI TECHNOLOGIES CO., LTD., Shenzhen (CN)

(72) Inventors: Xu Zhang, Beijing (CN); Lixia Xue, Beijing (CN); Yan Cheng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 37 days.

(21) Appl. No.: 16/265,963

(22) Filed: Feb. 1, 2019

(65) Prior Publication Data

US 2019/0174468 A1 Jun. 6, 2019

Related U.S. Application Data

(63) Continuation of application No. PCT/CN2017/096174, filed on Aug. 7, 2017.

(30) Foreign Application Priority Data

Aug. 12, 2016 (CN) .......................... 2016 1 0670186

(51) Int. Cl.
*H04W 72/04* (2009.01)
(52) U.S. Cl.
CPC ......... *H04W 72/042* (2013.01); *H04W 72/04* (2013.01); *H04W 72/044* (2013.01); *Y02D 30/70* (2020.08)
(58) Field of Classification Search
CPC . H04W 72/04; H04W 72/042; H04W 72/044; Y02D 70/00; Y02D 70/10; Y02D 70/12; Y02D 70/122; Y02D 70/126
See application file for complete search history.

(56) References Cited

U.S. PATENT DOCUMENTS

2010/0254268 A1* 10/2010 Kim .................. H04L 5/0053
370/241
2013/0194931 A1* 8/2013 Lee .................. H04W 72/04
370/241
(Continued)

FOREIGN PATENT DOCUMENTS

CN 102594513 A 7/2012
CN 103563319 A 2/2014
CN 104955111 A 9/2015

OTHER PUBLICATIONS

R1-164542 LG Electronics,"Discussions on DCI and sPDCCH for latency reduction",3GPP TSG RAN WG1 Meeting #85,Nanjing, China, May 23-27, 2016,total 6 pages.
(Continued)

*Primary Examiner* — Rina C Pancholi
(74) *Attorney, Agent, or Firm* — Kilpatrick Townsend & Stockton LLP

(57) ABSTRACT

Embodiments of the present invention provide a method and an apparatus for transmitting a downlink control channel. The downlink control channel includes a first downlink control channel and a second downlink control channel. The first downlink control channel includes a first RS and first DCI. A method for receiving a downlink control channel by user equipment includes: obtaining a first RS time-frequency resource corresponding to the first RS; determining a first DCI time-frequency resource corresponding to the first DCI based on the first RS time-frequency resource; detecting the first RS on the first RS time-frequency resource, and demodulating the first DCI on the first DCI time-frequency resource by using the first RS; and determining a second time-frequency resource corresponding to the second downlink control channel based on the first DCI.

17 Claims, 5 Drawing Sheets

(56) References Cited

U.S. PATENT DOCUMENTS

| | | | |
|---|---|---|---|
| 2013/0242882 A1* | 9/2013 | Blankenship | H04L 5/0041 370/329 |
| 2014/0044070 A1* | 2/2014 | Chen | H04W 72/0413 370/329 |
| 2015/0043465 A1* | 2/2015 | Ouchi | H04W 72/12 370/329 |
| 2015/0180625 A1* | 6/2015 | Park | H04W 72/042 370/329 |
| 2015/0208394 A1* | 7/2015 | Seo | H04W 72/042 370/329 |
| 2019/0007181 A1* | 1/2019 | Marinier | H04W 72/042 |

OTHER PUBLICATIONS

R1-120562 Qualcomm Incorporated, "Multiplexing of different DCI messages for e-PDCCH", 3GPP TSG RAN WG1 #68, Dresden, Germany, Feb. 6-10, 2012, total 2 pages.

* cited by examiner

METHOD AND APPARATUS FOR TRANSMITTING CONTROL CHANNEL

CROSS-REFERENCE TO RELATED APPLICATIONS

This application is a continuation of International Application No. PCT/CN2017/096174, filed on Aug. 7, 2017, which claims priority to Chinese Patent Application No. 201610670186.0, filed on Aug. 12, 2016. The disclosures of the aforementioned applications are hereby incorporated by reference in their entireties.

TECHNICAL FIELD

Embodiments of the present invention relate to the wireless communications field, and more specifically, to a data transmission method, a terminal device, a base station, and a communications system.

BACKGROUND

In a current mobile communications system, user equipment (UE) detects a control channel on a predefined time-frequency resource, and receives or sends data at a specified time-frequency resource location based on indication information on the channel. Before receiving or sending service data, the user equipment needs to learn of downlink control information (DCI) configured by an evolved NodeB for the user equipment. To demodulate the DCI, the user equipment first needs to detect a reference signal (RS), for example, a demodulation reference signal (DMRS) or a beam tracking RS, on a fixed time-frequency resource.

In a current Long Term Evolution (LTE) system, duration of one subframe is 1 millisecond (ms), and each subframe is further divided into two 0.5 ms slots. For a normal cyclic prefix (CP), each slot includes seven orthogonal frequency division multiplexing (OFDM) symbols. For an extended cyclic prefix (CP), each slot includes six OFDM symbols. The OFDM symbol is referred to as a symbol below.

A next-generation mobile communications system will support more types of services, including a wide coverage service, a low-latency service, and the like. These services have different requirements on a time-frequency resource. If a previous design of a downlink control channel is still used, a larger time-frequency resource area needs to be reserved, so that different types of control channels are separated in the time-frequency resource area. Therefore, user equipments of different services detect corresponding control channel areas. If an excessively large quantity of time-frequency resources are reserved, spectrum utilization is decreased. If an excessively small quantity of time-frequency resources are reserved, a control channel becomes a bottleneck of the system, and a large quantity of user equipments cannot receive and send data because of a failure in receiving control information.

SUMMARY

Embodiments of the present invention provide a method and an apparatus for sending a downlink control channel, a method and an apparatus for receiving a downlink control channel, and a system, to resolve, by dynamically/semi-statically sending or receiving a downlink control channel, a problem that a fixed downlink control channel cannot satisfy more types of services.

To achieve the foregoing objective, the following technical solutions are used in the embodiments of the present invention.

According to a first aspect, a method for receiving a downlink control channel is provided. The method includes: obtaining, by user equipment, a first RS time-frequency resource corresponding to a first RS, where the downlink control channel includes a first downlink control channel and a second downlink control channel, and the first downlink control channel includes the first RS and first DCI; determining, by the user equipment, a first DCI time-frequency resource corresponding to the first DCI based on the first RS time-frequency resource; detecting, by the user equipment, the first RS on the first RS time-frequency resource, and demodulating the first DCI on the first DCI time-frequency resource by using the first RS; and determining, by the user equipment, a second time-frequency resource corresponding to the second downlink control channel based on the first DCI.

In a possible design, the obtaining, by the user equipment, a first RS time-frequency resource corresponding to a first RS includes: receiving, by the user equipment, a first RS candidate time-frequency resource group, where the candidate time-frequency resource group is notified by using higher layer signaling and/or indicated by using a synchronization signal sequence; and searching, by the user equipment, for the first RS time-frequency resource based on the first RS candidate time-frequency resource group.

In a possible design, the obtaining a first RS time-frequency resource corresponding to a first RS includes: searching a candidate time-frequency resource group for the first RS time-frequency resource, where the candidate time-frequency resource group is notified by using higher layer signaling and/or indicated by using a synchronization signal sequence and/or third DCI, where the third DCI includes at least one piece of DCI received before the first RS time-frequency resource is obtained.

In a possible design, the second downlink control channel includes second DCI, the second time-frequency resource includes a second DCI time-frequency resource, and the determining, by the user equipment, a second time-frequency resource corresponding to the second downlink control channel based on the first DCI includes: determining, by the user equipment, the second DCI time-frequency resource corresponding to the second DCI based on the first DCI.

In a possible design, the method further includes: detecting, by the user equipment, the second DCI on the second DCI time-frequency resource.

In a possible design, the second downlink control channel includes a second RS and second DCI, the second time-frequency resource includes a second RS time-frequency resource and a second DCI time-frequency resource, the second RS corresponds to the second RS time-frequency resource, the second DCI corresponds to the second DCI time-frequency resource, and the method further includes: determining, by the user equipment, the second time-frequency resource corresponding to the second RS based on the second time-frequency resource; detecting, by the user equipment, the second RS on the second RS time-frequency resource; and demodulating, by the user equipment, the second DCI based on the second RS.

In a possible design, the method further includes: demodulating, by the user equipment, data corresponding to the second DCI based on the second RS.

In a possible design, the demodulating the second DCI based on the second RS includes: performing channel estimation based on the second RS, and demodulating the second DCI based on a result of the channel estimation.

In a possible design, the first DCI further includes second RS indication information, and the determining, by the user equipment, a second time-frequency resource corresponding to the second downlink control channel based on the first DCI includes: determining, by the user equipment based on the second RS indication information, a time-frequency resource corresponding to the second RS and/or an antenna port corresponding to the second RS.

In a possible design, the first time-frequency resource includes the first OFDM symbol in a subframe in time domain, and the second time-frequency resource includes the second and/or the third OFDM symbol in the subframe in time domain.

In a possible design, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

The foregoing embodiment of the present invention provides the method for receiving a downlink control channel. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

According to a second aspect, a method for sending a downlink control channel is provided. The method includes: indicating, by a base station on a first downlink control channel by using a first RS, a time-frequency resource corresponding to first DCI, where the first downlink control channel is included in the downlink control channel, and the first downlink control channel includes the first RS and the first DCI; sending, by the base station, the first downlink control channel to user equipment; determining, by the base station, that a second time-frequency resource corresponding to a second downlink control channel is indicated by using the first DCI; and sending, by the base station, the second downlink control channel to the user equipment.

In a possible design, the second downlink control channel includes second DCI, the second time-frequency resource includes a second DCI time-frequency resource, and that a second time-frequency resource corresponding to a second downlink control channel is indicated by using the first DCI includes: the second DCI time-frequency resource corresponding to the second DCI is indicated by using the first DCI.

In a possible design, the second downlink control channel includes a second RS and second DCI, the second time-frequency resource includes a second RS time-frequency resource and a second DCI time-frequency resource, the second RS corresponds to the second RS time-frequency resource, the second DCI corresponds to the second DCI time-frequency resource; and that a second time-frequency resource corresponding to a second downlink control channel is indicated by using the first DCI includes: the second DCI time-frequency resource corresponding to the second DCI is indicated by using the second RS; and the second RS time-frequency resource corresponding to the second RS is indicated by using the first DCI.

In a possible design, the second RS is further used to demodulate data corresponding to the second DCI.

In a possible design, the first DCI further includes second RS indication information, and that a second time-frequency resource corresponding to a second downlink control channel is indicated by using the first DCI includes: a time-frequency resource corresponding to a second RS and/or an antenna port corresponding to the second RS is indicated by the second RS indication information.

In a possible design, the first time-frequency resource includes the first OFDM symbol in a subframe in time domain, and the second time-frequency resource includes the second and/or the third OFDM symbol in the subframe in time domain.

In a possible design, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

The foregoing embodiment of the present invention provides the method for sending a downlink control channel. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

According to a third aspect, user equipment for receiving a downlink control channel is provided. The user equipment includes: a receiving unit, configured to receive a candidate time-frequency resource group in which a first RS time-frequency resource corresponding to a first RS is located, where the downlink control channel includes a first downlink control channel and a second downlink control channel, and the first downlink control channel includes the first RS and first DCI; and a processing unit, configured to: determine the first RS time-frequency resource based on the candidate time-frequency resource group; determine a first DCI time-frequency resource corresponding to the first DCI based on the first RS time-frequency resource; detect the first RS on the first RS time-frequency resource, and demodulate the first DCI on the first DCI time-frequency resource by using the first RS; and determine a second time-frequency resource corresponding to the second downlink control channel based on the first DCI.

In a possible design, the receiving unit is further configured to: receive, by the receiving unit, a notification of higher layer signaling; and/or receive, by the receiving unit, an indication of a synchronization signal sequence; and/or receive, by the receiving unit, an indication of third DCI, where the third DCI includes at least one piece of DCI received before the first RS time-frequency resource is obtained.

In a possible design, the second downlink control channel includes second DCI, the second time-frequency resource includes a second DCI time-frequency resource, and the processing unit is further configured to: determine, by the processing unit, the second DCI time-frequency resource corresponding to the second DCI based on the first DCI.

In a possible design, the processing unit is further configured to detect the second DCI on the second DCI time-frequency resource.

In a possible design, the second downlink control channel includes a second RS and second DCI, the second time-frequency resource includes a second RS time-frequency resource and a second DCI time-frequency resource, the second RS corresponds to the second RS time-frequency resource, the second DCI corresponds to the second DCI time-frequency resource, and the processing unit is further configured to: determine the second time-frequency resource corresponding to the second RS based on the second time-frequency resource; detect the second RS on the second RS time-frequency resource; and demodulate the second DCI based on the second RS.

In a possible design, the processing unit is further configured to: demodulate data corresponding to the second DCI based on the second RS.

In a possible design, the demodulating the second DCI based on the second RS includes: performing channel estimation based on the second RS, and demodulating the second DCI based on a result of the channel estimation.

In a possible design, the first DCI further includes second RS indication information, and the processing unit is further configured to: determine, by the processing unit based on the second RS indication information, a time-frequency resource corresponding to the second RS and/or an antenna port corresponding to the second RS.

In a possible design, the first time-frequency resource includes the first OFDM symbol in a subframe in time domain, and the second time-frequency resource includes the second and/or the third OFDM symbol in the subframe in time domain.

In a possible design, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

The foregoing embodiment of the present invention provides the user equipment for receiving a downlink control channel. A reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

According to a fourth aspect, a base station for sending a downlink control channel is provided. The base station includes: a processing unit, configured to indicate, on a first downlink control channel by using a first RS, a time-frequency resource corresponding to first DCI, where the first downlink control channel is included in the downlink control channel, and the first downlink control channel includes the first RS and the first DCI; and a sending unit, configured to send the first downlink control channel, where the processing unit is further configured to determine that a second time-frequency resource corresponding to a second downlink control channel is indicated by using the first DCI; and the sending unit is further configured to send the second downlink control channel.

In a possible design, the second downlink control channel includes second DCI, the second time-frequency resource includes a second DCI time-frequency resource, and the processing unit is further configured to: determine, by the processing unit, that the second DCI time-frequency resource corresponding to the second DCI is indicated by using the first DCI.

In a possible design, the second downlink control channel includes a second RS and second DCI, the second time-frequency resource includes a second RS time-frequency resource and a second DCI time-frequency resource, the second RS corresponds to the second RS time-frequency resource, the second DCI corresponds to the second DCI time-frequency resource; and the processing unit is further configured to: determine, by the processing unit, that the second DCI time-frequency resource corresponding to the second DCI is indicated by using the second RS; and determine, by the processing unit, that the second RS time-frequency resource corresponding to the second RS is indicated by using the first DCI.

In a possible design, the second RS is further used to demodulate data corresponding to the second DCI.

In a possible design, the first DCI further includes second RS indication information, and the processing unit is further configured to: determine, by the processing unit, that a time-frequency resource corresponding to a second RS and/or an antenna port corresponding to the second RS is indicated by the second RS indication information. In a possible design, the first time-frequency resource includes the first OFDM symbol in a subframe in time domain, and the second time-frequency resource includes the second and/or the third OFDM symbol in the subframe in time domain.

In a possible design, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

The foregoing embodiment of the present invention provides the base station for sending a downlink control channel. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system.

According to a fifth aspect, user equipment for receiving a downlink control channel is provided. The user equipment includes: a receiver, configured to receive a candidate time-frequency resource group in which a first RS time-frequency resource corresponding to a first RS is located, where the downlink control channel includes a first downlink control channel and a second downlink control channel, and the first downlink control channel includes the first RS and first DCI; and a processor, configured to: determine the first RS time-frequency resource based on the candidate time-frequency resource group; determine a first DCI time-frequency resource corresponding to the first DCI based on the first RS time-frequency resource; detect the first RS on the first RS time-frequency resource, and demodulate the first DCI on the first DCI time-frequency resource by using the first RS; and determine a second time-frequency resource corresponding to the second downlink control channel based on the first DCI.

According to a sixth aspect, a base station for sending a downlink control channel is provided. The base station includes: a processor, configured to indicate, on a first downlink control channel by using a first RS, a time-frequency resource corresponding to first DCI, where the first downlink control channel is included in the downlink control channel, and the first downlink control channel includes the first RS and the first DCI; and a transmitter, configured to send the first downlink control channel, where the processor is further configured to determine that a second time-frequency resource corresponding to a second downlink control channel is indicated by using the first DCI; and the transmitter is further configured to send the second downlink control channel.

The embodiments of the present invention provide the methods and apparatuses for receiving and sending a downlink control channel. The methods for sending and receiving a downlink control channel in the present invention effectively resolve the problem that a fixed downlink control channel cannot satisfy more types of services.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DESCRIPTION OF EMBODIMENTS

Figure 1:
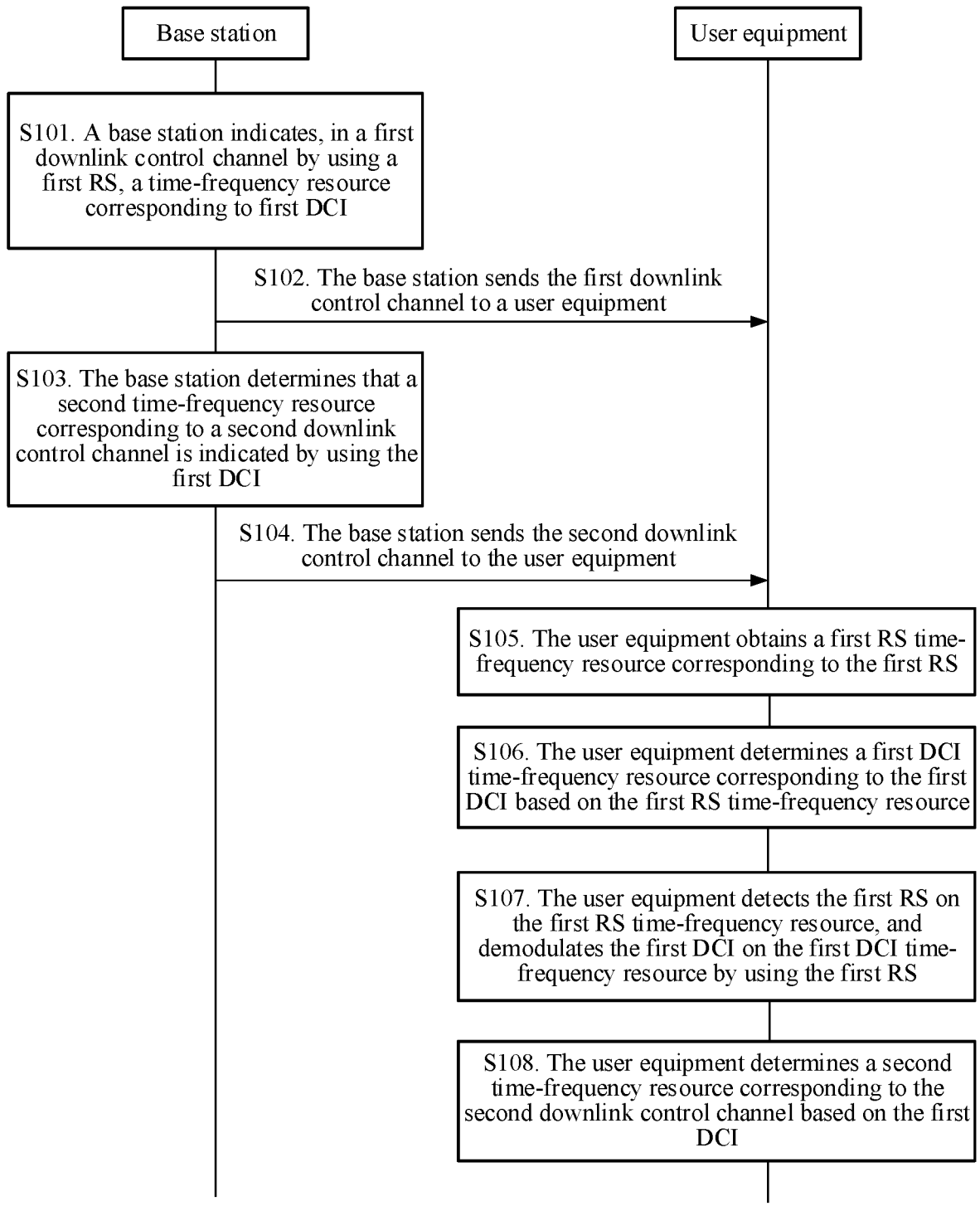
FIG. 1 is a flowchart of a method for transmitting a control channel according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items.

The technical solutions of the present invention may be applied to various communications systems, such as a GSM system, a Code Division Multiple Access (CDMA) system, a Wideband Code Division Multiple Access (WCDMA) system, a General Packet Radio Service (GPRS) system, and a Long Term Evolution (LTE) system.

User equipment may also be referred to as a terminal device, a mobile terminal, a mobile terminal device, or the like, and can communicate with one or more core networks by using a radio access network (RAN). The terminal device may be a mobile terminal, for example, a mobile phone (or referred to as a "cellular" phone) or a computer having a mobile terminal. The terminal device, for example, may be a portable, pocket-sized, handheld, computer built-in, or in-vehicle mobile apparatus. They exchange voice and/or data with the radio access network.

A base station may be a base transceiver station (BTS) in GSM or CDMA, a NodeB in WCDMA, or an evolved NodeB (eNB or eNodeB, evolved Node B) in LTE. This is not limited in the present invention.

To make the present invention clearer, the following brief descriptions are first provided.

A downlink control channel mentioned in the present invention means that information related to downlink control that is sent by the base station to the user equipment is carried on a physical downlink control channel (PDCCH). The downlink control channel may include a reference signal (RS), downlink control information (DCI), a RS indication, and the like.

The downlink control channel in the present invention includes a first downlink control channel and a second downlink control channel. The first downlink control channel may include a first RS and first DCI respectively corresponding to a first RS time-frequency resource and a first DCI time-frequency resource. The second downlink control channel may include a second RS and second DCI respectively corresponding to a second RS time-frequency resource and a second DCI time-frequency resource. Refer to subsequent descriptions for details of a manner of distinguishing between the first DCI and the second DCI.

A time-frequency resource in the present invention is a resource that can be used to transmit information in time domain and in frequency domain. To fully use the resource, the resource is segmented by using one OFDM symbol as a minimum granularity in time domain and using one subcarrier as a minimum granularity in frequency domain. A minimum granularity unit includes one OFDM symbol and one subcarrier. The minimum granularity unit is also referred to as a resource element (RE). During resource mapping, information or a signal is mapped based on the minimum granularity unit.

Different information or signals will be respectively mapped onto different time-frequency resource elements. When the user equipment or the base station learns of a time-frequency resource corresponding to information or a signal, the user equipment or the base station may obtain the corresponding information or signal carried at a location of the time-frequency resource based on the location of the time-frequency resource.

An embodiment of the present invention provides a method for transmitting a downlink control channel between a base station and user equipment, as shown in FIG. 1. The downlink control channel includes a first downlink control channel and a second downlink control channel.

The method includes the following steps.

Step 101: The base station indicates, on the first downlink control channel by using a first RS, a time-frequency resource corresponding to first DCI, where the first downlink control channel is included in the downlink control channel, and the first downlink control channel includes the first RS and the first DCI.

Step 102: The base station sends the first downlink control channel to the user equipment.

Step 103: The base station determines that a second time-frequency resource corresponding to the second downlink control channel is indicated by using the first DCI.

Optionally, the second downlink control channel includes a second RS and second DCI, the second time-frequency resource includes a second RS time-frequency resource and a second DCI time-frequency resource, the second RS corresponds to the second RS time-frequency resource, and the second DCI corresponds to the second DCI time-frequency resource.

The sending that a second time-frequency resource corresponding to the second downlink control channel is indicated by using the first DCI includes two cases.

In a first case, the second DCI time-frequency resource corresponding to the second DCI is indicated by using the first DCI.

In a second case, the second DCI time-frequency resource corresponding to the second DCI is indicated by using the second RS, and the second RS time-frequency resource corresponding to the second RS is indicated by using the first DCI.

In the second case, the second RS is further used to demodulate data corresponding to the second DCI.

Optionally, in step 103, the first DCI further includes second RS indication information, and that a second time-frequency resource corresponding to the second downlink control channel is indicated by using the first DCI includes: a time-frequency resource corresponding to a second RS and/or an antenna port corresponding to the second RS is indicated by the second RS indication information.

Optionally, the first time-frequency resource includes the first OFDM symbol in a subframe in time domain, and the second time-frequency resource includes the second and/or the third OFDM symbol in the subframe in time domain. This part will be described in a more detailed manner in subsequent step 108.

Optionally, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI. Division about the first DCI and the second DCI will be described in a more detailed manner in subsequent step 108.

Step 104: The base station sends the second downlink control channel to the user equipment.

Step 105: The user equipment obtains a first RS time-frequency resource corresponding to the first RS.

Optionally, step 105 may be implemented by using the following steps:

Step 105-1: The user equipment receives a first RS candidate time-frequency resource group, where the candidate time-frequency resource group is notified by using higher layer signaling and/or indicated by using a synchronization signal sequence; and Step 105-2: The user equipment searches for the first RS time-frequency resource based on the first RS candidate time-frequency resource group.

Figure 2:
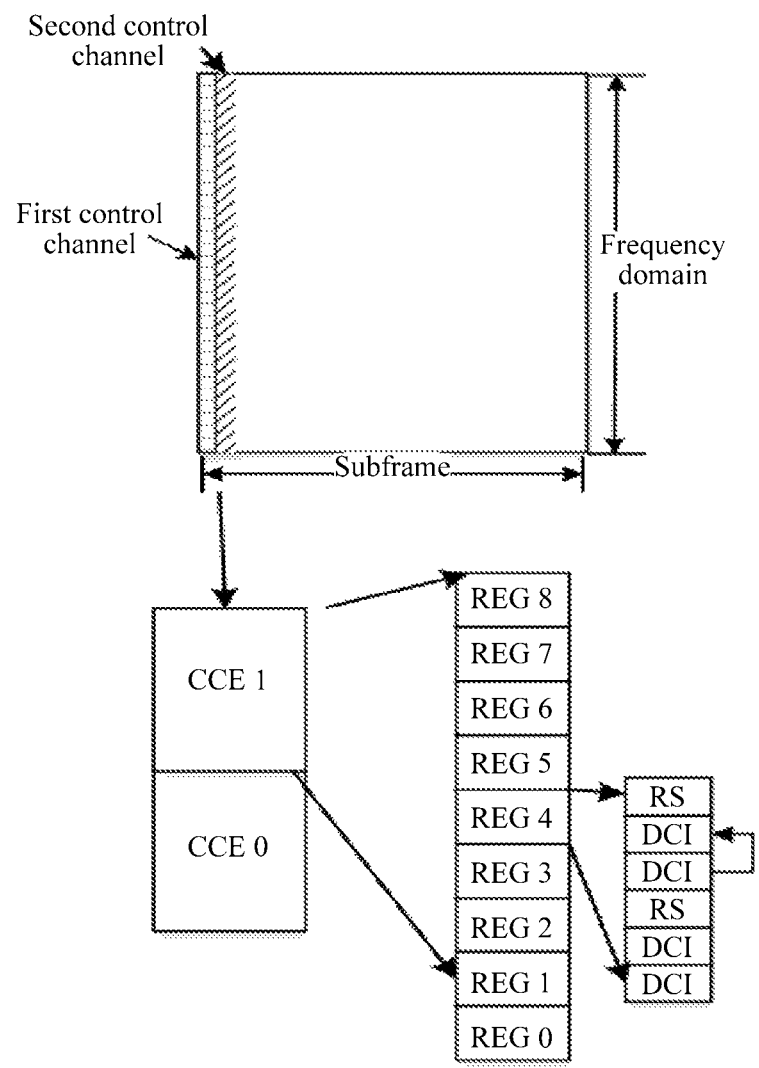
FIG. 2 is a schematic diagram of a time-frequency resource for a control channel according to an embodiment of the present invention.

A time-frequency resource corresponding to the first downlink control channel is shown in FIG. 2. A time-frequency resource for a downlink control channel includes several control channel elements (CCE), for example, CCE 0 and CCE 1 in FIG. 2. Each CCE includes several resource element groups (REG). In LTE, each CCE includes nine REGs, and each REG includes a plurality of resource elements (RE). In LTE, each REG includes four REs. Therefore, each REG corresponding to the first downlink control channel includes an RE for the first RS and an RE for the first DCI.

As shown in FIG. 2, a time-frequency resource location of the first RS is located in each REG, and each REG includes six REs. The first RS is mapped onto two REs, namely, RE 0 and RE 3, in an RE set {RE 0, RE 1, ..., RE 5} of REG 4. Similarly, an RS in another REG may also be located at the same time-frequency resource location.

Optionally, the first RS candidate time-frequency resource group is a sum of time-frequency resource locations at which the first RS in each REG is possibly located.

As shown in Table 1, the candidate time-frequency resource group includes three groups of candidate time-frequency resources with resource group indexes 1, 2, and 3. Using the candidate time-frequency resource group index 1 as an example, the first RS time-frequency resource is located at {RE 0}, {RE 3}, or {RE 0, RE 3} in each REG. The time-frequency resource location {RE 0, RE 3} represents that a corresponding RS can be obtained only by detecting both RE 0 and RE 3 in each REG.

TABLE 1

| Candidate time-frequency resource group | |
|---|---|
| Resource group index | Resource element location in REG |
| 1 {RE 0}, {RE 3}, or | {RE 0, RE 3} |
| 2 {RE 1}, {RE 4}, or | {RE 1, RE 4} |
| 3 {RE 2}, {RE 5}, or | {RE 2, RE 5} |

As described in step 105-1, the user equipment may obtain the candidate time-frequency resource group based on the indication of the synchronization signal sequence.

For example, the synchronization signal sequence carries cell ID information, and the user equipment may obtain indication information of a time-frequency resource group based on the received cell ID information. For example, resource group index=mod(cell ID, $N$), where N is a quantity of a time-frequency resource group indexes.

Optionally, the user equipment obtains the candidate time-frequency resource group by using any one of the foregoing manners or a combination of two manners.

In step 105-2, the first RS is detected in a search space based on the candidate time-frequency resource group.

In step 105-1, a candidate time-frequency resource group in each REG is obtained. Therefore, the first RS can be obtained only by further determining all REGs that need to be detected on the first downlink control channel.

The time-frequency resource corresponding to the first downlink control channel may be divided into several time-frequency resource areas based on a CCE granularity of the first downlink control channel. The user equipment searches in the areas of the first downlink control channel based on a predefined CCE granularity.

The predefined CCE granularity is also referred to as an aggregation level. For example, different aggregation levels may be divided for the downlink control channel based on different transmitted content. The aggregation levels include 1, 2, 4, 8, and the like. Each aggregated CCE resource group is referred to as a search space. If configured aggregation levels are 4 and 8, the user equipment receives the first RS and the first DCI on the time-frequency resource for the entire control channel by using four CCEs as one group and by using eight CCEs as one group.

Figure 3:
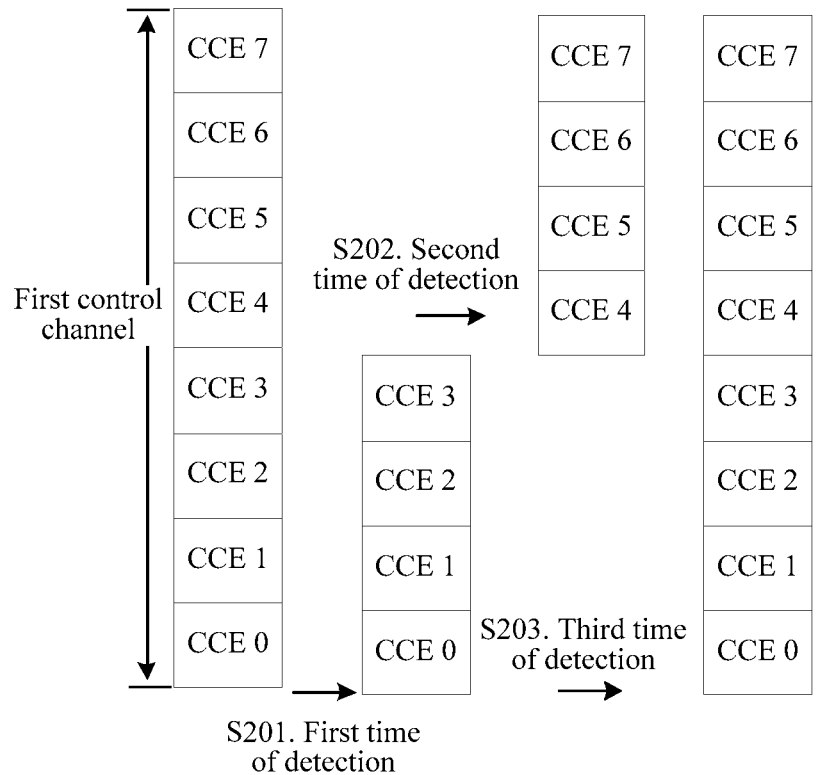
FIG. 3 is a schematic diagram of a time-frequency resource for a first downlink control channel according to an embodiment of the present invention.

Using FIG. 3 as an example, the first downlink control channel includes eight CCEs, namely, CCE 0 to CCE 7. Assuming that the configured aggregation levels are 4 and 8, when detecting the first RS, the user equipment needs to detect a search space formed by one group of four CCEs and a search space formed by one group of eight CCEs. The detecting process may include the following steps:

S201: During the first time of detection, the user equipment detects a search space formed by CCE 0 to CCE 3.

S202: During the second time of detection, the user equipment detects a search space formed by CCE 4 to CCE 7.

S203: During the third time of detection, the user equipment detects a search space formed by CCE 0 to CCE 7.

It should be understood that an order of the foregoing detection steps is not limited. Optionally, the user equipment detects a candidate time-frequency resource location in each REG in the search space in a predefined order, to determine the first RS time-frequency resource.

In other words, the user equipment determines the first RS time-frequency resource in at least one search space on the first downlink control channel based on indication information of the first RS candidate time-frequency resource group.

Optionally, the user equipment detects a plurality of groups of RS sequences {S1, S2, . . . , SL} on a time-frequency resource corresponding to each time-frequency resource group index of the candidate time-frequency resource group. Using the resource group index 1 in Table 1 as an example, when the resource group index is 1, time-frequency resources corresponding to the resource group index are {RE 0}, {RE 3}, or {RE 0, RE 3}.

In this case, the user equipment separately receives {RE 0}, {RE 3}, or {RE 0, RE 3} in each REG in CCE 0 to CCE 3, {RE 0}, {RE 3}, or {RE 0, RE 3} in each REG in CCE 4 to CCE 7, and {RE 0}, {RE 3}, or {RE 0, RE 3} in each REG in CCE 0 to CCE 7, and can obtain three groups of RS sequences {S1, S2, S3} in each search space.

The user equipment performs coherent detection on the received RS sequences based on a predefined RS sequence R1. If the received plurality of groups of RS sequences match the predefined RS sequence, it is determined that the time-frequency resource corresponding to the time-frequency resource group index is the first RS time-frequency resource. Still using the resource group index 1 in Table 1 as an example, it is assumed that the predefined RS sequence is R1. If {S1} matches R1, in the resource group index 1, {RE 0} in each REG is the first RS time-frequency resource in the search space.

The predefined RS sequence may be pre-stored in the user equipment or may be indicated by using higher layer signaling.

Alternatively, the user equipment may obtain the candidate time-frequency resource group based on an indication of third DCI. The third DCI includes at least one piece of DCI received before the first RS time-frequency resource is obtained. For example, a previous downlink control channel received by the user equipment before the downlink control channel is received includes the third DCI.

Step 106: The user equipment determines a first DCI time-frequency resource corresponding to the first DCI based on the first RS time-frequency resource.

Step 107: The user equipment detects the first RS on the first RS time-frequency resource, and demodulates the first DCI on the first DCI time-frequency resource by using the first RS.

Each REG for the first downlink control channel includes only two signals: the first RS and the first DCI. Therefore, after the first RS time-frequency resource is determined, the other time-frequency resource in the REG is the first DCI time-frequency resource. Based on the foregoing method, the user equipment determines the first DCI time-frequency resource.

After determining the first DCI time-frequency resource, the user equipment obtains the first DCI on the first DCI time-frequency resource.

As described in step 106, the user equipment may detect the first RS when determining the first RS time-frequency resource.

Step 108: The user equipment determines the second time-frequency resource corresponding to the second downlink control channel based on the first DCI.

Optionally, in a first case, the second downlink control channel includes second DCI but does not include an RS, and the user equipment directly determines a second DCI time-frequency resource corresponding to the second DCI based on the first DCI, so as to detect the second DCI.

Specifically, the second time-frequency resource includes the second DCI time-frequency resource. That the user equipment determines the second time-frequency resource corresponding to the second downlink control channel based on the first DCI includes: determining, by the user equipment, the second DCI time-frequency resource corresponding to the second DCI based on the first DCI.

Optionally, after determining the second DCI time-frequency resource corresponding to the second DCI based on the first DCI, the user equipment may further detect the second DCI on the second DCI time-frequency resource.

In addition, optionally, in a second case, the second downlink control channel includes a second RS and second DCI. The user equipment determines, based on the first DCI, a time-frequency resource on which the second RS is located, and then receives the second DCI based on the second RS.

Specifically, the second time-frequency resource includes a second RS time-frequency resource and a second DCI time-frequency resource. The second RS corresponds to the second RS time-frequency resource, and the second DCI corresponds to the second DCI time-frequency resource. The method further includes:

determining, by the user equipment, the second time-frequency resource corresponding to the second RS based on the second time-frequency resource; and demodulating, by the user equipment, the second DCI based on the second RS.

It can be learned from the foregoing two cases that the second downlink control channel may include or may not include the second RS. When the second downlink control channel includes the second RS, the first RS included on the first downlink control channel may be different from the second RS.

Optionally, in either of the foregoing cases, the user equipment may further demodulate data corresponding to the second DCI based on the second RS.

Figure 4:
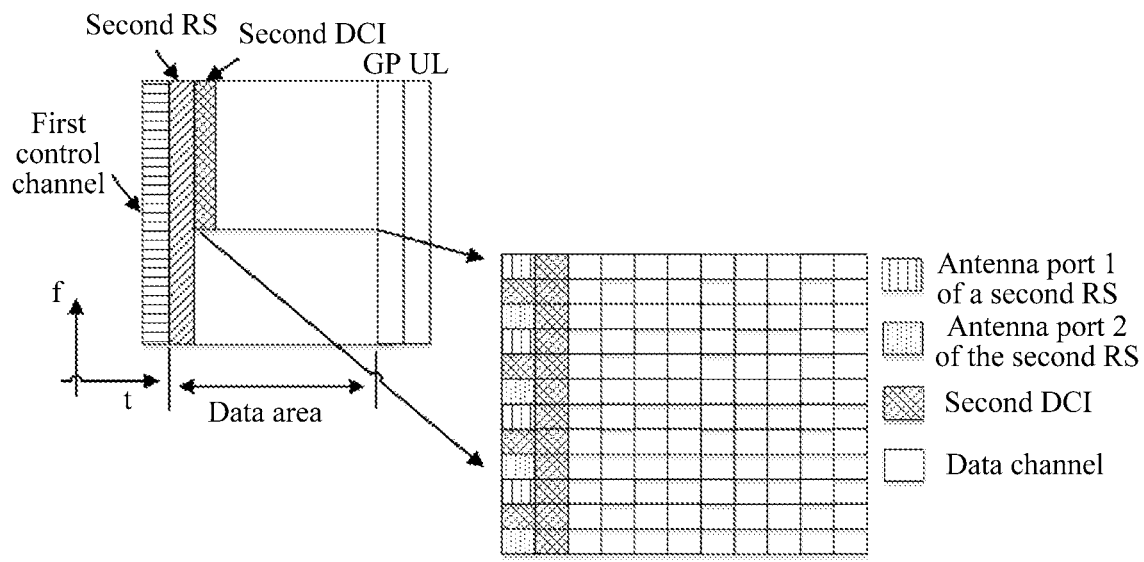
FIG. 4 is a schematic diagram of time-frequency resources corresponding to second DCI and a second RS according to an embodiment of the present invention.

Optionally, the second DCI time-frequency resource is located on the first and/or the second OFDM symbol in a data area, as shown in FIG. 4. The data area includes all OFDM symbols in a subframe in a downlink transmission time-frequency resource except the first downlink control channel.

As shown in FIG. 4, a frequency-domain subcarrier of the second RS time-frequency resource overlaps with a subcarrier of a time-frequency resource for a data channel corresponding to the second RS. Therefore, after receiving the second RS, the user equipment performs channel estimation on the second DCI time-frequency resource and a time-frequency resource for a data channel corresponding to the second DCI. The user equipment can obtain a channel status on each RE in the data area based on the channel estimation. The data area includes the second DCI time-frequency resource and the time-frequency resource corresponding to the data channel. The channel status on each RE includes magnitude of channel fading experienced on the RE.

The user equipment may compensate for all REs in the data area based on the estimated channel status, to improve quality of a signal received on the RE, so that the user equipment can correctly demodulate the received signal.

Optionally, in step 108, that the user equipment determines the second time-frequency resource corresponding to the second downlink control channel based on the first DCI may include: performing, by the user equipment, channel estimation based on the second RS, and demodulating the second DCI based on a result of the channel estimation.

The channel estimation is to estimate a channel status on the second DCI time-frequency resource corresponding to the second DCI by using the second RS. Based on a known reference signal sequence, the user equipment may compare the known RS sequence with a received second RS, to obtain a status of channel fading experienced by the second RS, so as to estimate a status of channel fading on the second DCI time-frequency resource. The user equipment compensates for the received second DCI signal based on the status of channel fading, to recover quality of the second DCI signal, so that the user equipment can correctly demodulate the second DCI.

Optionally, in step 108, the first DCI may further include second RS indication information, and that the user equipment determines the second time-frequency resource corresponding to the second downlink control channel based on the first DCI includes: determining, by the user equipment based on the second RS indication information, a time-frequency resource corresponding to the second RS and/or an antenna port corresponding to the second RS.

For example, the antenna port of the second RS includes $\{1, 2\}$, and time-frequency resources corresponding to different antenna ports are shown in FIG. 4. The second RS indication information received by the user equipment includes antenna port information of the second RS. The user equipment receives, based on a received antenna port number, the second RS on a time-frequency resource corresponding to the received antenna port number.

Optionally, in this embodiment, the first time-frequency resource includes the first OFDM symbol in a subframe in time domain, and the second time-frequency resource includes the second and/or the third OFDM symbol in the subframe in time domain.

Specifically, as described above, one subframe in time domain may include 12 or 14 OFDM symbols. The first OFDM symbol is a resource occupied by the first time-frequency resource corresponding to the first downlink control channel in time domain. Namely, the first OFDM symbol in time domain is used to send the first downlink control channel. Optionally, in frequency domain, the first downlink control channel may occupy one or more sub-bands.

The time-frequency resource for the second downlink control channel may be included in a time-frequency resource for transmitting data channel. The following cases are specifically included.

In a first case, the second OFDM symbol is used to transmit the second RS in the second downlink control channel, and OFDM symbols starting from the third OFDM symbol are used to transmit other information and data in the second downlink control channel.

In a second case, the second DCI occupies all OFDM symbols in data areas at specified frequency-domain resource locations, and the OFDM symbols can be used to transmit more control information.

The first case mainly relates to services that require quick demodulation and decoding, for example, low-latency and high-reliability services. When receiving downlink data, the user equipment needs to immediately demodulate the received data, to satisfy a low-latency requirement.

The second case mainly relates to wide-coverage type services, for example, machine type communications. For a wide-coverage type service, DCI needs to be sent/received by using more OFDM symbols, to satisfy a reliability requirement.

Optionally, in this embodiment, the first DCI corresponds to a first group of DCI formats, the second DCI corresponds to a second group of DCI formats, and the first group and the second group are divided based on functions of DCI formats.

The first group of DCI formats includes at least indication information of the second time-frequency resource, indication information of the second DCI time-frequency resource and the second RS indication information.

The second group of DCI formats includes at least downlink data resource allocation information and uplink scheduling information.

In addition, optionally, the first group of DCI formats corresponds to the first case, and the second group of DCI formats corresponds to the second case.

Optionally, a quantity of bits (payload size) included in each DCI format in the first group of DCI formats is less than a quantity of bits included in each DCI format in the second group of DCI. For example, in a 20 MHz FDD (frequency division duplex) system, different DCI carries different formats, as shown in the following Table 2.

It can be learned from Table 2 that a maximum quantity of bits included in the first DCI is 46, and a minimum quantity of bits included in the second DCI is 54.

TABLE 2

| DCI Format | Payload Size (Bits) | Type |
| --- | --- | --- |
| Format 0 | 44 | First DCI |
| Format 1 | 55 | First DCI |
| Format 1A | 44 | First DCI |
| Format 1B | 46 | First DCI |
| Format 1C | 31 | First DCI |
| Format 1D | 46 | First DCI |
| Format 2 | 67 | Second DCI |
| Format 2A | 64 | Second DCI |
| Format 2B | 64 | Second DCI |
| Format 2C | 66 | Second DCI |
| Format 3 | 44 | First DCI |
| Format 3A | 44 | First DCI |
| Format 4 | 54 | Second DCI |

Optionally, the first RS may correspond to a first beam, and the second RS may correspond to a second beam.

In a first case, the first beam is the same as the second beam.

The user equipment may obtain, based on the first beam corresponding to the first RS, a channel status of the beam on the time-frequency resource of the first downlink control channel, and demodulate the first DCI based on the channel status estimated by using the first RS.

If a time-frequency resource corresponding to the channel status estimated by using the first RS includes the second DCI time frequency resource and the time-frequency resource for the data channel corresponding to the second DCI, both the second DCI and the corresponding data may be demodulated based on the channel status estimated by using the first RS.

In a second case, the first beam is different from the second beam.

In this case, the user equipment can only demodulate the first DCI based on the first RS, and demodulate the second DCI based on the second RS.

It should be noted that in all the embodiments of the present invention, unless otherwise particularly stated, an order of the steps in the embodiments is not limited, and interdependent relationships among the steps are not limited. For example, a relationship between step 103 and step 104 that are performed by the base station and step 105 to step 108 that are performed by the user equipment is not limited. Specifically, for example, in step 102, after the base station sends the first downlink control channel, the user equipment may perform step 105 to obtain the first RS time-frequency resource corresponding to the first RS.

In Embodiment 1 of the present invention, different reference signals are separately demodulated in a transmission manner using two levels of control channels. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

Figure 5:
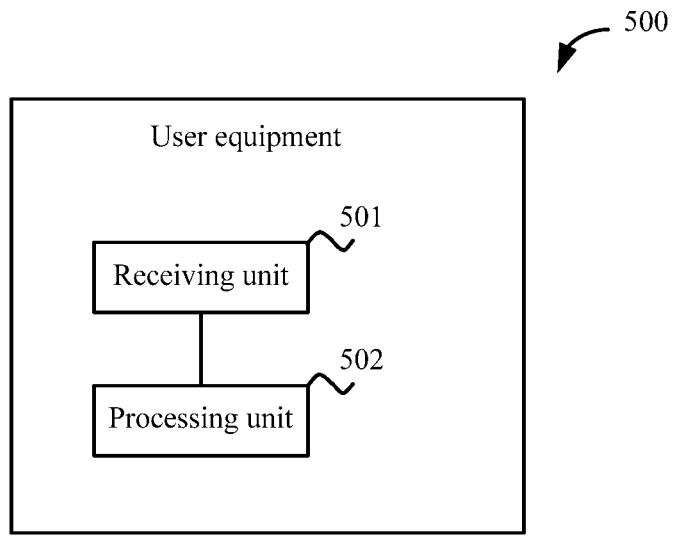
FIG. 5 is a schematic structural diagram of user equipment according to an embodiment of the present invention.

FIG. 5 is a schematic diagram of user equipment according to an embodiment of the present invention. The user equipment 500 in FIG. 5 includes a receiving unit 501 and a processing unit 502.

The receiving unit 501 is configured to receive a candidate time-frequency resource group in which a first RS time-frequency resource corresponding to a first RS is located. The downlink control channel includes a first downlink control channel and a second downlink control channel, and the first downlink control channel includes the first RS and first DCI.

Optionally, the receiving unit 501 is further configured to: receive, by the receiving unit 501, a notification of higher layer signaling; and/or receive, by the receiving unit 501, an indication of a synchronization signal sequence; and/or receive, by the receiving unit 501, an indication of third DCI, where the third DCI includes at least one piece of DCI received before the first RS time-frequency resource is obtained.

The processing unit 502 is configured to: determine the first RS time-frequency resource based on the candidate time-frequency resource group; determine a first DCI time-frequency resource corresponding to the first DCI based on the first RS time-frequency resource; detect the first RS on the first RS time-frequency resource, and demodulate the first DCI on the first DCI time-frequency resource by using the first RS; and determine a second time-frequency resource corresponding to the second downlink control channel based on the first DCI.

Optionally, the second downlink control channel includes second DCI, and the second time-frequency resource includes a second DCI time-frequency resource. That the processing unit 502 determines a second time-frequency resource corresponding to the second downlink control channel based on the first DCI includes: determining, by the processing unit 502, the second DCI time-frequency resource corresponding to the second DCI based on the first DCI.

Optionally, the processing unit 502 is further configured to detect the second DCI on the second DCI time-frequency resource.

Optionally, the second downlink control channel includes a second RS and second DCI, the second time-frequency resource includes a second RS time-frequency resource and a second DCI time-frequency resource, the second RS corresponds to the second RS time-frequency resource, and the second DCI corresponds to the second DCI time-frequency resource. The processing unit 502 is further configured to: determine the second time-frequency resource corresponding to the second RS based on the second time-frequency resource; detect the second RS on the second RS time-frequency resource; and demodulate the second DCI based on the second RS.

Optionally, the processing unit 502 is further configured to: demodulate data corresponding to the second DCI based on the second RS.

Optionally, the processing unit 502 is further configured to: perform channel estimation based on the second RS, and demodulate the second DCI based on a result of the channel estimation.

Optionally, the first DCI further includes second RS indication information. That the processing unit 502 determines a second time-frequency resource corresponding to the second downlink control channel based on the first DCI includes: determining, by the processing unit 502 based on the second RS indication information, a time-frequency resource corresponding to the second RS and/or an antenna port corresponding to the second RS.

Optionally, the first time-frequency resource includes the first OFDM symbol in a subframe in time domain, and the second time-frequency resource includes the second and/or the third OFDM symbol in the subframe in time domain.

Optionally, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

In addition, optionally, the processing unit 502 in the user equipment 500 may perform all steps performed by the user equipment except step 105-1 in step 105 in Embodiment 1 of the present invention.

Embodiment 2 of the present invention provides the user equipment. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

Figure 6:
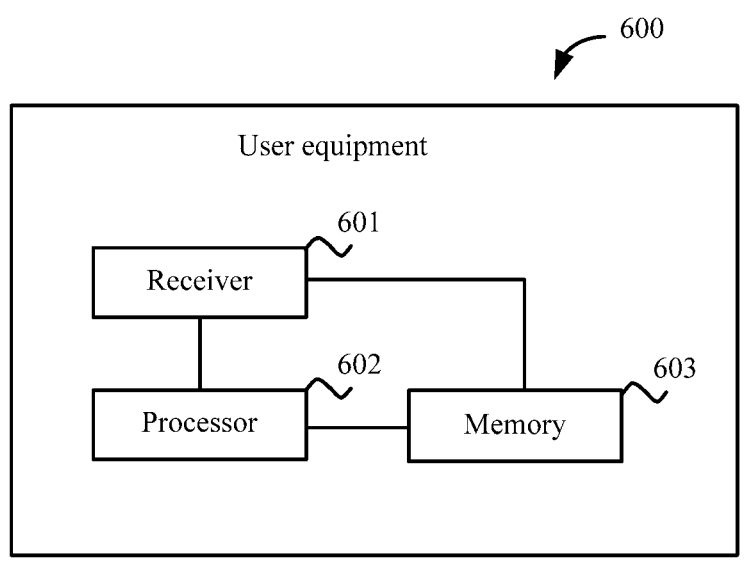
FIG. 6 is a schematic structural diagram of another user equipment according to an embodiment of the present invention.

Embodiment 3 of the present invention further provides user equipment. FIG. 6 is a schematic structural diagram of the user equipment according to Embodiment 3 of the present invention. As shown in FIG. 6, the user equipment 600 may include a receiver 601 and a processor 602. Optionally, the receiver 601 can implement a function of the receiving unit 501 in Embodiment 2, and the processor 602 can implement a function of the processing unit 502 in Embodiment 2.

Optionally, the user equipment 600 may further include a memory 603. The memory 603 may be configured to store code executed by the processor 602, and the like.

Optionally, the processor 602 may be a CPU, or another general-purpose processor, a DSP, an ASIC, an FPGA, another programmable logic device, discrete gate or transistor logic device, or discrete hardware component, or the like. The general-purpose processor may be a microprocessor, or the processor may be any conventional processor or the like.

Figure 7:
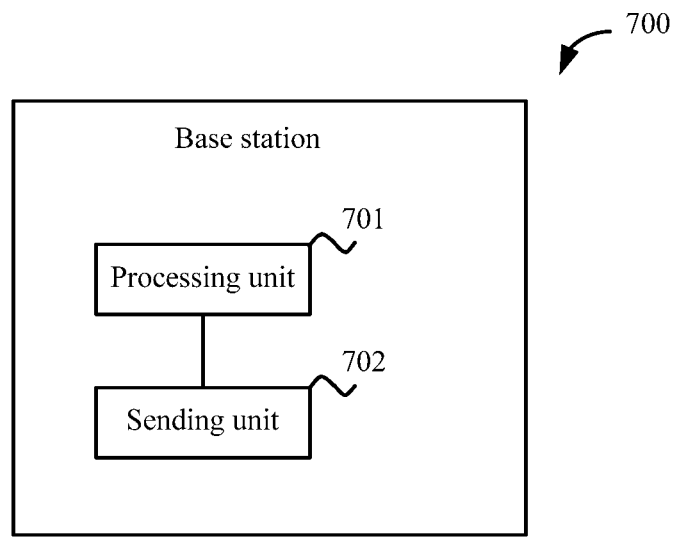
FIG. 7 is a schematic structural diagram of a base station according to an embodiment of the present invention.

FIG. 7 is a schematic diagram of a base station according to an embodiment of the present invention. The base station 700 in FIG. 7 includes a processing unit 701 and a sending unit 702.

The processing unit 701 is configured to indicate, on a first downlink control channel by using a first RS, a time-frequency resource corresponding to first DCI. The first downlink control channel is included in a downlink control channel, and the first downlink control channel includes the first RS and the first DCI.

The sending unit 702 is configured to send the first downlink control channel.

The processing unit 701 is further configured to determine that a second time-frequency resource corresponding to a second downlink control channel is indicated by using the first DCI.

The sending unit 702 is further configured to send the second downlink control channel.

Optionally, the second downlink control channel includes second DCI, and the second time-frequency resource includes a second DCI time-frequency resource. That the processing unit 701 determines that a second time-frequency resource corresponding to a second downlink control channel is indicated by using the first DCI includes:

determining, by the processing unit 701, that the second DCI time-frequency resource corresponding to the second DCI is indicated by using the first DCI.

Optionally, the second downlink control channel includes a second RS and second DCI, the second time-frequency resource includes a second RS time-frequency resource and a second DCI time-frequency resource, the second RS corresponds to the second RS time-frequency resource, and the second DCI corresponds to the second DCI time-frequency resource.

That the processing unit 701 determines that a second time-frequency resource corresponding to a second downlink control channel is indicated by using the first DCI includes:

determining, by the processing unit 701, that the second DCI time-frequency resource corresponding to the second DCI is indicated by using the second RS; and determining, by the processing unit 701, that the second RS time-frequency resource corresponding to the second RS is indicated by using the first DCI.

Optionally, the second RS is further used to demodulate data corresponding to the second DCI.

Optionally, the first DCI further includes second RS indication information. That the processing unit 701 determines that a second time-frequency resource corresponding to a second downlink control channel is indicated by using the first DCI includes:

determining, by the processing unit 701, that a time-frequency resource corresponding to a second RS and/or an antenna port corresponding to the second RS is indicated by the second RS indication information.

Optionally, the first time-frequency resource includes the first OFDM symbol in a subframe in time domain, and the second time-frequency resource includes the second and/or the third OFDM symbol in the subframe in time domain.

Optionally, the first DCI corresponds to a first group of DCI formats, the second DCI corresponds to a second group of DCI formats, and a quantity of bits included in each DCI format in the first group of DCI formats is less than a quantity of bits included in each DCI format in the second group of DCI.

In addition, optionally, the processing unit 701 in the base station 700 may perform step 101 and step 103 that are performed by the base station in Embodiment 1 of the present invention.

Embodiment 4 of the present invention provides the base station. A time-frequency resource location of a reference signal in a first-level control channel is flexibly configured, and a time-frequency resource area of a second-level control channel and reference signal information are indicated by using the first-level control channel, so that the second-level control channel obtains a frequency selective gain, and a control channel capacity is increased. In addition, the reference signal is transmitted together with a control channel, so that the reference signal does not need to be transmitted when there is no control channel. In this way, time-frequency resources fixedly occupied by a system are reduced to the greatest extent, thereby bringing a beneficial effect of a forward compatibility feature, and reducing energy consumption of the system. Further, a quantity of times of blind detection performed by the user equipment in this time-frequency resource area is reduced based on a configured association relationship between a control signaling format and a control channel.

Figure 8:
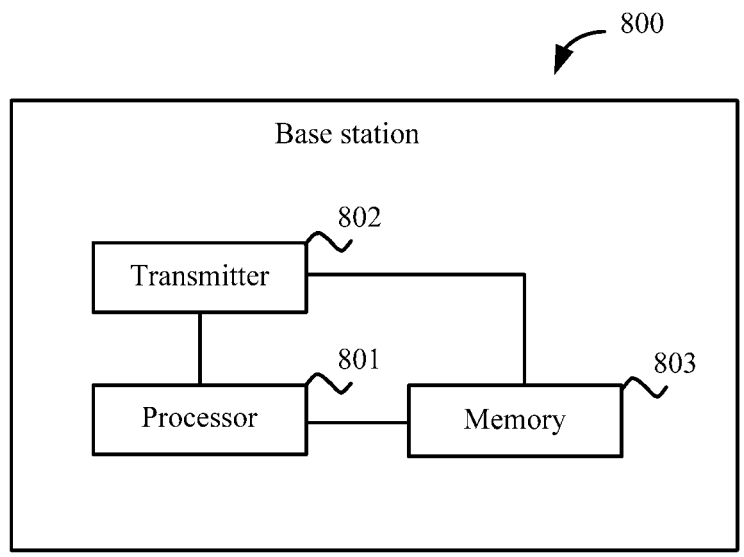
FIG. 8 is a schematic structural diagram of another base station according to an embodiment of the present invention.

Embodiment 5 of the present invention further provides a base station. FIG. 8 is a schematic structural diagram of the base station according to Embodiment 5 of the present invention. As shown in FIG. 8, the base station 800 may include a processor 801 and a transmitter 802. Optionally, the processor 801 can implement a function of the processing unit 701 in Embodiment 4, and the transmitter 802 can implement a function of the processing unit 702 in Embodiment 4.

Optionally, the base station 800 may further include a memory 803. The memory 803 may be configured to store code executed by the processor 801, and the like.

Optionally, the processor 801 may be a CPU, or another general-purpose processor, a DSP, an ASIC, an FPGA, another programmable logic device, discrete gate or transistor logic device, or discrete hardware component, or the like. The general-purpose processor may be a microprocessor, or the processor may be any conventional processor or the like.

It may be clearly understood by a person skilled in the art that, for the purpose of convenient and brief description, for a detailed working process of the foregoing apparatuses and units, refer to a corresponding process in the foregoing method embodiments, and details are not described herein again.

In the several embodiments provided in this application, it should be understood that the disclosed apparatuses and methods may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for receiving a downlink control channel, comprising:

obtaining, by user equipment, a first reference signal (RS) time-frequency resource corresponding to a first RS, wherein the downlink control channel comprises a first downlink control channel and a second downlink control channel, and the first downlink control channel comprises the first RS and first downlink control information (DCI);

determining, by the user equipment, a first DCI time-frequency resource corresponding to the first DCI based on the first RS time-frequency resource;

detecting, by the user equipment, the first RS on the first RS time-frequency resource, and demodulating the first DCI on the first DCI time-frequency resource by using the first RS; and determining, by the user equipment, a second time-frequency resource corresponding to the second downlink control channel based on the first DCI; and, wherein the second downlink control channel comprises a second RS and second DCI, and the second time-frequency resource comprises a second RS time-frequency resource and a second DCI time-frequency resource, the second RS corresponding to the second RS time-frequency resource, and the second DCI corresponding to the second DCI time-frequency resource, and the method further comprises:

determining, by the user equipment, the time-frequency resource corresponding to the second RS based on the second time-frequency resource;

detecting, by the user equipment, the second RS on the second RS time-frequency resource; and demodulating, by the user equipment, the second DCI based on the second RS.

2. The method according to claim 1, wherein obtaining the first RS time-frequency resource corresponding to the first RS comprises:

searching a candidate time-frequency resource group for the first RS time-frequency resource, wherein the candidate time-frequency resource group is notified by using higher layer signaling and/or indicated by using a synchronization signal sequence and/or third DCI, wherein the third DCI comprises at least one piece of DCI received before the first RS time-frequency resource is obtained.

3. The method according to claim 1, wherein the second downlink control channel comprises second DCI, the second time-frequency resource comprises a second DCI time-frequency resource, and determining, by the user equipment, the second time-frequency resource corresponding to the second downlink control channel based on the first DCI comprises: determining, by the user equipment, the second DCI time-frequency resource corresponding to the second DCI based on the first DCI.

4. The method according to claim 3, wherein the method further comprises: detecting, by the user equipment, the second DCI on the second DCI time-frequency resource.

5. The method according to claim 1, further comprising: demodulating, by the user equipment, data corresponding to the second DCI based on the second RS.

6. The method according to claim 1, wherein the demodulating the second DCI based on the second RS comprises: performing channel estimation based on the second RS, and demodulating the second DCI based on a result of the channel estimation.

7. User equipment for receiving a downlink control channel, comprising:
   a receiving unit, configured to receive a candidate time-frequency resource group in which a first reference signal (RS) time-frequency resource corresponding to a first RS is located, wherein the downlink control channel comprises a first downlink control channel and a second downlink control channel, and the first downlink control channel comprises the first RS and first downlink control information (DCI); and
   a processing unit, configured to:
   determine the first RS time-frequency resource based on the candidate time-frequency resource group;
   determine a first DCI time-frequency resource corresponding to the first DCI based on the first RS time-frequency resource;
   detect the first RS on the first RS time-frequency resource, and demodulate the first DCI on the first DCI time-frequency resource by using the first RS; and
   determine a second time-frequency resource corresponding to the second downlink control channel based on the first DCI; and, wherein the second downlink control channel comprises a second RS and second DCI, and the second time-frequency resource comprises a second RS time-frequency resource and a second DCI time-frequency resource, the second RS corresponding to the second RS time-frequency resource, and the second DCI corresponding to the second DCI time-frequency resource, and the processing unit is further configured to:
   determine the second time-frequency resource corresponding to the second RS based on the second time-frequency resource;
   detect the second RS on the second RS time-frequency resource; and
   demodulate the second DCI based on the second RS.

8. The user equipment according to claim 7, wherein the receiving unit is further configured to:
   receive, by the receiving unit, a notification of higher layer signaling; and/or
   receive, by the receiving unit, an indication of a synchronization signal sequence; and/or
   receive, by the receiving unit, an indication of third DCI, wherein the third DCI comprises at least one piece of DCI received before the first RS time-frequency resource is obtained.

9. The user equipment according to claim 7, wherein the second downlink control channel comprises second DCI, the second time-frequency resource comprises a second DCI time-frequency resource, and the processing unit is further configured to: determine, by the processing unit, the second DCI time-frequency resource corresponding to the second DCI based on the first DCI.

10. The user equipment according to claim 9, wherein the processing unit is further configured to detect the second DCI on the second DCI time-frequency resource.

11. The user equipment according to claim 7, wherein the processing unit is further configured to:
   demodulate data corresponding to the second DCI based on the second RS.

12. The user equipment according to claim 7, wherein the demodulating the second DCI based on the second RS comprises:
   performing channel estimation based on the second RS, and demodulating the second DCI based on a result of the channel estimation.

13. The user equipment according to claim 7, wherein the first DCI further comprises second RS indication information, and the processing unit is further configured to:
   determining, by the processing unit based on the second RS indication information, a time-frequency resource corresponding to the second RS and/or an antenna port corresponding to the second RS.

14. A base station for sending a downlink control channel, comprising:
   a processing unit, configured to indicate, on a first downlink control channel by using a first reference signal (RS), a time-frequency resource corresponding to first DCI, wherein the first downlink control channel is comprised in the downlink control channel, and the first downlink control channel comprises the first RS and the first downlink control information (DCI); and
   a sending unit, configured to send the first downlink control channel, wherein
   the processing unit is further configured to determine that a second time-frequency resource corresponding to a second downlink control channel is indicated by using the first DCI; and
   the sending unit is further configured to send the second downlink control channel; and, wherein the second downlink control channel comprises a second RS and second DCI, and the second time-frequency resource comprises a second RS time-frequency resource and a second DCI time-frequency resource, the second RS corresponding to the second RS time-frequency resource, and the second DCI corresponding to the second DCI time-frequency resource, and the processing unit is further configured to:
   determine, by the processing unit, that the second DCI time-frequency resource corresponding to the second DCI is indicated by using the second RS; and
   determine, by the processing unit, that the second RS time-frequency resource corresponding to the second RS is indicated by using the first DCI.

15. The base station according to claim 14, wherein the second downlink control channel comprises second DCI, the second time-frequency resource comprises a second DCI time-frequency resource, and the processing unit is further configured to:

determine, by the processing unit, that the second DCI time-frequency resource corresponding to the second DCI is indicated by using the first DCI.

16. The base station according to claim 14, wherein the second RS is further used to demodulate data corresponding to the second DCI.

17. The base station according to claim 14, wherein the first DCI further comprises second RS indication information, and the processing unit is further configured to:

determine, by the processing unit, that a time-frequency resource corresponding to a second RS and/or an antenna port corresponding to the second RS is indicated by the second RS indication information.

* * * * *